United States Patent [19]

Bowman

[11] 3,855,167

[45] Dec. 17, 1974

[54] PAVING COMPOSITIONS AND METHODS OF MAKING SAME

[76] Inventor: Harold M. Bowman, 475 Humiston Dr., Bay Village, Ohio 44140

[22] Filed: Sept. 29, 1969

[21] Appl. No.: 862,021

[52] U.S. Cl. ............ 260/28, 106/273 R, 106/273 N, 106/280, 106/281 R, 117/62.2, 117/72, 117/92, 117/161, 117/168, 117/161 L, 260/37 R
[51] Int. Cl. ... C08g 51/52, C08h 13/00, C08k 1/62
[58] Field of Search ........................... 106/273–284, 106/308; 260/28.5, 28, 37, 838; 117/54, 62.2, 72, 92, 100, 123, 135.5, 161, 168; 264/29, 105

[56] References Cited
UNITED STATES PATENTS

| | | | |
|---|---|---|---|
| 1,966,094 | 7/1934 | Herbst | 106/280 |
| 2,314,181 | 3/1943 | Winterkorn | 260/38 |
| 2,644,772 | 7/1953 | Kaye | 117/100 S |

*Primary Examiner*—Joan B. Evans Welcome
*Attorney, Agent, or Firm*—Baldwin, Egan, Walling & Fetzer

[57] ABSTRACT

Paving compositions containing an asphalt binder and mineral aggregate are prepared in which the aggregate includes particles thereof coated with an oil soluble curable resin that is compatible with the asphalt and a hardening agent for converting the resin into a thermoset polymer when mixed with the hot asphalt. The compositions are readily formed into pavement having high stability and good flow properties.

17 Claims, No Drawings

PAVING COMPOSITIONS AND METHODS OF MAKING SAME

THE INVENTION

The present invention relates to methods for making bituminous paving compositions and forming and hardening the same into pavement such as road surface layers having an excellent balance of desirable properties including durability, smoothness and skid resistance as well as outstanding properties of stability and flow. The present invention also relates to the bituminous compositions and the pavements formed therefrom.

In the past, bituminous and particularly asphalt materials have been used as binders for mineral aggregates to make compositions that are formed and hardened into pavements and heavy duty floors. The resultant pavements including road surface layers have not had as high a stability property, along with a good flow property, as desired. One of the difficulties to be overcome in preparing such pavements is the unsatisfactory coating or bonding action of the asphalt binders on the aggregate particles.

It is an object of the present invention to provide a bituminous paving composition that is readily formed and hardened into a pavement having high stability and good flow properties, and to methods of making the composition and forming the pavement therefrom.

It is an object of the present invention to provide an outstanding paving composition comprising an asphalt having a penetration of about 60 to 90 as a binder for mineral aggregate, a part of the aggregate being particles coated with a coating composition comprising an oil-soluble curable phenol-formaldehyde resin and sufficient hardening to convert the resin to a thermoset polymer.

It is an object of the present invention to provide an improved method of making asphalt pavement in which asphalt is mixed with mineral aggregate such as sand and limestone dust as a filler material to provide a paving composition that is formed into pavement relatively soon after mixing.

These and other objects will be apparent from the specification that follows and the appended claims.

The present invention provides a method for making bituminous pavement including road surface layers, the method comprising (1) mixing hot bituminous material that is preferably asphalt having a penetration of about 60 to 90 with a finely and/or semi-finely divided mineral aggregate that includes particles thereof coated with an oil-soluble curable resin that is compatible with the asphalt and sufficient amount of a hardening agent to convert the resin to a thermoset material when contacted and mixed with the hot asphalt, and (2) forming the mixture of step (1) and hardening the same into asphalt pavement having a good balance of properties and outstanding stability and flow properties.

The present invention is also directed to the paving composition that is formed into the hardened pavement and to the pavement. Broadly stated, the bituminous composition for forming the outstanding pavement having good durability, skid resistance, smoothness, high stability, and good flow is one that comprises:

a. a bituminous material that is preferably asphalt having a penetration of about 60 to 100 as a binder, although higher and lower penetrations of 40 to 130 are workable, b. mineral aggregate that is preferably sand with some limestone dust although larger sand or stone aggregate is usable, and c. as a part of the aggregate, a plurality of finely and-/or semi-finely divided particles of aggregate that is preferably sand, each of the particles of sand being coated with a coating composition comprising an oil-soluble curable resin compatible with the asphalt, and sufficient hardening agent to cure the resin to provide the pavement having a stability at least about 1,200 pounds measured by the Marshall stability test and a flow of about 7 to 15 as measured by the inclined glass plate flow test in which the millimeters of flow of a 0.5 gram tablet of the resin heated to 125°C are recorded when the plate is inclined at 65° from the horizontal.

d. for preliminary or base courses of road surfaces, a plurality of large sand or stone aggregate can be coated with an oil-soluble curable resin compatible with the asphalt and a sufficient amount of a hardening agent to convert the resin to a thermoset material when contacted and mixed with the hot asphalt and mineral aggregate.

As previously indicated, the present invention includes an improvement in the process of making asphalt pavements, especially sand asphalt pavements. As is known in the art, the asphalt binder is mixed with the mineral aggregate to provide a paving composition that is formed into pavement including road surface layers relatively soon after mixing and at least the same day that it is mixed. The improvement includes the step of mixing with hot asphalt a plurality of sand particles and/or larger particles of aggregate (as a part of the total mineral aggregate), each of which particles are substantially completely coated with a coating composition comprising (1) an oil-soluble curable phenol-formaldehyde novolak resin that adheres to the aggregate particles and is compatible with the asphalt and (2) a sufficient amount of hexamethylenetetramine as a hardening agent to convert the resin to its thermoset state when mixed with the hot asphalt whereby the resin and hardening agent are heated to a curing temperature, depending upon the hardening agent used, for a sufficient time to cause the resin coated aggregate material to react. Temperatures between 400°F to 450°F, or lower with some resins, and a mixing time of at least 3 to 4 seconds and preferably 45 seconds are required to cause a thermoset reaction of the intimately mixed coated and uncoated particles of sand or stone aggregate and the hot asphalt.

The resultant pavement or heavy duty flooring made according to methods of the present invention have high stability properties along with good flow properties. As measured by the Marshall stability test, the pavements have stabilities of at least 1,200 pounds and preferably 1,500–2,000 pounds. More preferably, stabilities are obtained in the range of 3,000 and higher. Along with the unusually high stabilities, the pavements have desirable flows in the range generally of about 6 to 7 up to 15 or 16 and preferably about 8 to 13 as measured by the previously mentioned inclined glass plate flow test. The best results, when the stability property is quite high, say at least 2,500 pounds, the flows can be kept in the 9 to 12 range where the pavement is not too brittle or not too soft and deformable.

The Marshall test is known in the art and is described in U.S. Pat. No. 3,074,807 which is incorporated by reference herein. It also discloses bituminous including asphalt binders and mineral aggregate such as sand, granite, gravel and limestone including graded aggregates.

Suitable liquid asphalt binders are also described in U.S. Pat. No. 3,347,690 as is suitable aggregate.

The preferred sand asphalt pavements are made with finely divided sand in the range of about 4 to 200 mesh and where each particle or grain is not substantially larger than about one-sixteenth inch. This is in contrast to asphaltic concretes, where the stone or aggregate is much larger, say about three-fourths inch or in the range of one-half inch to 1 inch.

The coated mineral aggregate particles, which are preferably sand particles, can be coated by using a liquid oil-soluble curable resin or a normally solid oil-soluble further curable resin that is compatible with the asphalt binder.

The sand particles can be coated as described in U.S. Reissue Pat. No. 25,661 which is assigned to the Hooker Chemical Corporation or U.S. Pat. No. 2,888,418. The latter patent also in column 2 describes a highly preferred normally solid oil-soluble novolak coating resin of the present invention in which the novolak is described as an acid-catalyzed reaction product of about 0.75 to 0.9 moles of formaldehyde per mole of phenol. These patents are incorporated by reference.

The coaating composition can include wax as a lubricant, generally about 2 to 10 and preferably 4 to 7 parts by weight of the wax being used per 70 to 90 parts of the resin. The above mentioned U.S. Pat. No. 2,888,418 describes suitable waxes.

The coating composition can include generally about 5 or 10 up to 35 or 40 parts of the same liquid asphalt as the binder per 70 to 90 parts of the oil-soluble resin. Preferably about 10 to 30 parts of the liquid asphalt is used which apparently aids in the coating operation and functions as a plasticizer for the resin.

When the coating composition includes a solution of the oil-soluble resin in a solvent such as ethanol, methanol, butanol or other organic solvent, the solid content is generally about 1 or 2 up to 10 or 12%, although the solids content is preferably about 3 to 8%. The optimum solids content is about 4 to 6% by weight.

As previously indicated, the oil-soluble phenolformaldehyde novolak resins are highly preferred for use in coating the sand or aggregate particles. A preferred oil-soluble resin is a thermoplastic phenol-formaldehyde flake novolak resin requiring the addition of about 10 to 18% hexa to produce thermosetting properties. The resin has contraction point in °C of 66 and an I.P. flow (0.2 gram pill) mm of 190. Such a resin is Durez 22591 sold by the Durex Division of Hooker Chemical Corp. Another suitable oil-soluble novolak resin is Durez 12686 which is a cashew-nut shell modified novolak or "two-step" phenolic resin used with hexa to convert it to a thermoset material. It has a contraction point of 60°C and an I.R. flow (0.2 fram) of 140 mm and its cured specific gravity (with 8% hexa) is 1.18.

In preparing road surfaces, it is highly advantageous to have a coating composition and resultant initially mixed paving composition that has a stable pot life and an oil-soluble resin in particular that does not set up too soon. A water-soluble type of phenol-formaldehyde resin sets up too quickly and is not manageable and hence cannot be used in the present methods and compositions. Such a composition would set up either in the asphalt mixing mill or in the trucks used to bring the material to the paving site.

The use of the oil-soluble novolak coating resin makes it possible to lay a one-half inch road surface layer instead of a 1 to 4 inches road surface layer inasmuch as the pavement of the present invention has such high stability and good flow properties. It also provides great stability to the edges of the pavement.

When all the above rigid requirements are not needed or economy is not important, the oil-soluble curable resin used to coat the aggregate particles can be a polyurethane, polyester or epoxy resin. Such oil-soluble thermoplastic further curable resins are known in the art. As to the polyurethane resin, oil-soluble polyurethane prepolymers which are compatible with asphalt binders for mineral aggregate are disclosed in U.S. Pat. No. 3,179,610. Polyurethanes are reaction products of polyisocyanates and polyols and suitable polyisocyanates and polyols (polyesters and polyethers) are disclosed in the U.S. Pat. No. 3,179,610 which is incorporated by references. Suitable oil-soluble epoxy resins that are cured with an amine or other hardening agent are well known in the art. The preferred epoxy resins are those that are the reaction products of epichlorohydrin and bisphenol A such as Epon 828, etc. U.S. Pat. No. 3,036,041 describes Epon 828 as an example of a commercially available reaction product of (1) a compound containing the ethylene oxide or oxirane group and a polydric polynuclear phenolic compound such as bisphenol A which is di (p-hydroxyphenol) dimethylmethane. This patent also discloses epoxylated novolak compounds which are suitable oil-soluble resins and the disclosure is incorporated by reference.

Suitable oil-soluble further curable polyesters are well known in the art and are condensation products of dibasic organic acids such as adipic acid or succinic acid and glycol, diethylene glycol and propylene glycol. As is well known in the art, the polyesters are made with a slight excess of glycol and the polyesters can be dissolved in a monomeric crosslinking agent such as styrene or acrylonitrile and used as solution which will harden to form a thermoset material. Dicumyl peroxide can be used as a catalyst to promote the crosslinking of the polyesters polymer with the styrene, as is well known. Polyesters are described as one of the polyurethane-forming ingredients in previously discussed U.S. Pat. No. 3,179,610.

The following examples are intended to illustrate the present invention and not to limit the same.

EXAMPLE 1

Silica sand was coated with oil-soluble phenol-formaldehyde resins, the sand having the following approximate size:

| | |
|---|---|
| No. 4 screen (U.S. sieve) | 100% by weight passing |
| No. 10 screen | 35–55% passing, retaining 40 mesh |
| No. 40 screen | 30–50% passing, retaining 80 mesh |
| No. 80 screen | 8–20% passing, retaining 200 mesh |
| No. 200 screen | 0–5%, passing |

The sand was coated with various solutions of oil-soluble phenol-formaldehyde resins, the solutions including one of 5% by weight and one of 4% by weight.

EXAMPLE 2

Asphalt paving compositions, using the coated sand of Example 1 with the 5% solids by weight of phenol-formaldehyde novolak resin, were prepared and tested for stability and flow properties. An asphalt paving composition containing uncoated sand was used as a control, it being formula 2A while the composition with the coated sand is formula 2B. The formulations are as follows with the weight being in grams:

FORMULATION 2A

|  | % By Weight | Weight (gms) |
|---|---|---|
| Asphalt | 8.5 | 340 |
| Limestone dust | 12 | 480 |
| Natural sand (uncoated) | 79.5 | 3180 |
|  | 100 | 4000 |

FORMULATION 2B

|  | % By Weight | Weight (gms) |
|---|---|---|
| Asphalt | 8.5 | 340 |
| Limestone dust | 12 | 480 |
| Coated sand | 39.75 | 1590 |
| Natural sand (uncoated) | 39.75 | 1590 |
|  | 100.00 | 4000 |

Each of the above formulations 2A and 2B were tested in triplicate, the molding temperature, flow stability and corrected stability (taking into consideration the volume of the samples). The test results are as follows:

| MIX. NO. | SAMPLE NO. | MOLDING TEMP. (°F) | CORRECTED STABILITY | STABILITY | FLOW |
|---|---|---|---|---|---|
| 2A | 1 | 300 | 1334 | 650 | 11 |
| 2A | 2 | 300 | 1170 | 700 | 11 |
| 2A | 3 | 300 | 1440 | 700 | 10 |
| 2B | 1 | 250 | 938 | 350 | 7 |
| 2B | 2 | 350 | 766 | 400 | 8 |
| 2B | 3 | 425 | 1868 | 1500 | 10 |

It can be seen that the stability for sample No. 3 of Mix No. 2B (made with coated sand) was outstanding. In addition, the flow property was good, indicating that commercially useful pavement composition can be easily prepared from the formulation. It can be seen that the higher molding temperature of 425°F was apparently sufficiently high to cure the oil-soluble phenolic resin bind and provide the high stability.

The oil-soluble phenolic resin used to coat in sand in formulation 2B was an acid catalyst novolak type resin prepared with an excess amount of phenol. The resin is a thermoplastic resin in a 5% solution. Hexamethylenetetramine (hexa) is added to convert it to a thermoset resin upon heating. The resin is a two step or two stage resin as described in U.S. Pat. No. 3,020,254, and particularly in column 4, where it is described. The first stage resin is made by condensing the phenol with the aldehyde using a mole ratio of one phenol to about 0.5 to 0.85 mole of the aldehyde in the present of sulfuric acid or other acid catalyst. After the condensation has progressed, the acid catalyst is neutralized and the water evaporated. The resin is cooled and solidified and powdered. Hexa in about 5 to 30% by weight of the resin, is used to make the resin potentially thermosetting.

Durez Phenolic Resin 22360, sold by the Durez Plastics Division of Hooker Chemical Corporation, and having a specific gravity of about 1.1 at 25°C/4°C, a viscosity of about 1,400 cp. at 25°C, and a flash point of 85–90°F can be used to provide the results set forth in the table showing the outstanding combination of flow and stability properties in Sample No. 3 of Mix 2A (the coated sand).

EXAMPLE 3

Asphalt paving compositions were prepared as in Example 2 except that the coated sand was made with a 4% by weight oil-soluble phenol-formaldehyde novolak resin instead of 5% by weight. Formula or Mix 3 was tested, the results of which are as follows:

| MIX NO. | SAMPLE NO. | MOLDING TEM. (°F) | VOLUME OF SAMPLE (cc) | CORRECTION FACTOR | STABILITY | CORRECTION STABILITY | FLOW |
|---|---|---|---|---|---|---|---|
| 3 | A | 250 | 345.7 | 2.08 | 420 | 874 | 7 |
| 3 | B | 300 | 356.7 | 1.92 | 460 | 883 | 7 |
| 3 | C | 400 | 334.9 | 2.27 | 1065 | 2327 | 8 |
| 3 | D | 450 | 389.1 | 1.67 | 2000 | 3340 | 11 |
| 3 | E | 450 | 436.1 | 1.32 | 2470 | 3260 | 12 |

It can be seen that at the molding temperature of 400° and 450°F, the paving compositions (samples C, D and E) had high stabilities and flows. Apparently, the unique combination of stability and flow is due to the proper activation of the oil-soluble phenol-formaldehyde novolak resin.

EXAMPLE 4

Asphalt paving compositions were prepared from the following formulation:

FORMULATION 4

|  | % by Weight | Weight (Gms) |
|---|---|---|
| Asphalt (70–85 penetration) | 8.5 | 340 |
| Limestone dust | 12.0 | 480 |
| Natural sand | 39.7 | 1588 |
| Coated sand | 39.8 | 1592 |
|  | 100.0 | 4000 |

The sand was coated with an oil-soluble oil modified phenol-formaldehyde novolak varnish resin, the resin being mixed the 70–85 penetration asphalt used as the base of the formulation. The coating was a 4% by weight solution the solids content thereof being 40% by weight of the liquid asphalt and 60% of the varnish resin.

EXAMPLE 5

An asphalt paving formulation was made approximately like that set forth in Example 4 except that the phenolic varnish resin was replaced by an oil-soluble thermoplastic phenol-formaldehyde resin similar to that used in formation 2B, the thermoplastic resin of Example 5 having a specific gravity of about 1.114 at 25°C/4°C, a viscosity of approximately 4,200 cp. at 25°C, and a flash point (Tagliabue Open Cup) of 105° to 110°F. An example of such a thermoplastic resin is Durez phenolic resin 18115 sold by the Durez Plastics Division of the Hooker Chemical Corporation, North Tonawanda, N.Y. The coating material for the sand contained 20% by weight of the liquid asphalt instead of 40% asphalt as in Example 4.

The mixes of formulations 4 and 5 were tested as in Example 2 with the following results:

| MIX NO. | SAMPLE NO. | MOLDING TEMP. (°F) | VOLUME OF SAMPLE (cc) | CORRECTION FACTOR | STABILITY | CORRECTION STABILITY | FLOW |
|---|---|---|---|---|---|---|---|
| 4 | A | 450 | 398.0 | 1.56 | 2020 | 3151 | 12 |
| 4 | B | 450 | 449.5 | 1.25 | 2060 | 2575 | 13 |
| 4 | C | 450 | 364.7 | 1.92 | 2200 | 4224 | 15 |
| 5 | A | 450 | 440.8 | 1.32 | 1550 | 2046 | 13 |
| 5 | B | 450 | 367.4 | 1.92 | 1200 | 2304 | 14 |
| 5 | C | 450 | 423.1 | 1.39 | 1800 | 2502 | 11 |

It can be seen that excellent stability measurements were obtained when liquid asphalt was made a part of the coating material along with the oil-soluble further curable phenol-formaldehyde resin.

Durez phenolic resin 27200, a tung oil-modified oil-soluble thermoplastic phenol-formaldehyde, requiring hexa to cure, can be used in the formulation 4 to provide equivalent results.

EXAMPLE 6

Asphalt paving compositions were prepared as described in the previous example using the following formulation:

| INGREDIENT | % by Weight | Weight (gms) |
|---|---|---|
| Asphalt (70–85 penetration) | 8.5 | 340 |
| Limestone dust | 12.0 | 480 |
| Natural sand | 63.6 | 2544 |
| Coated sand | 15.9 | 636 |
| | 100.0 | 4000 |

The mixes, in which 80% by weight of the sand used was untreated and 20% was coated with a soluation (4% by weight solids content) of an oil-soluble phenol-formaldehyde novolak flake resin. The novolak coating resin was mixed with 20% liquid asphalt as was the coating resin of Example 5. The results of tests on the mixes are as follows:

| MIX NO. | SAMPLE NO. | MOLDING TEMP. (°F) | VOLUME OF SAMPLE (cc) | CORRECTION FACTOR | STABILITY | CORRECTION STABILITY | FLOW |
|---|---|---|---|---|---|---|---|
| 6 | A | 450 | 325.9 | 2.27 | 1460 | 3314 | 10 |
| 6 | B | 460 | 368.3 | 1.67 | 2410 | 4025 | 11 |
| 6 | C | 450 | 325.2 | 1.92 | 1910 | 3667 | 11 |

Equivalent results are obtained when the sand is coated with Durez phenolic resin 22303, an oil-soluble phenol-formaldehyde flake resin.

EXAMPLE 7

Asphalt paving compositions were prepared as described in Example 6 except that the oil-soluble phenol-formaldehyde resin was a wax-bearing flaked novolak. Durez phenolic resin 22591 flake novolak resin is such an oil-soluble resin.

The mixes, like those of Example 6, were brought up to a temperature of 450°F and continuously mixed at that temperature for at least 20 minutes before molding the sample specimens. The mixes were tested, the results of which are as follows:

| MIX NO. | SAMPLE NO. | MOLDING TEMP. (°F) | VOLUME OF SAMPLE (cc) | CORRECTION FACTOR | STABILITY | CORRECTION STABILITY | FLOW |
|---|---|---|---|---|---|---|---|
| 7 | A | 455 | 441.5 | 1.19 | 1910 | 2273 | 9 |
| 7 | B | 450 | 423.3 | 1.32 | 2010 | 2653 | 9 |
| 7 | C | 450 | 430.0 | 1.32 | 2610 | 3445 | 8 |

EXAMPLES 8, 9 and 10

A series of asphalt/sand compositions were made in which different oil-soluble curable asphalt-compatible polymers were used to coat 20% of the total sand used. The formulations were as follows:

| INGREDIENT | % by Weight | Weight (gms) |
|---|---|---|
| Asphalt (70–85 penetration) | 8.5 | 340 |
| Limestone dust | 12.0 | 480 |
| Natural sand | 63.6 | 2544 |
| Coated sand | 15.9 | 636 |
| | 100.0 | 4000 |

The coating material of Example 8 was a 4% by weight solution of phenolic polyol catalyzed with a blocked isocyanateterminated relatively low molecular weight polyurethane. The oil-soluble polyurethane-forming ingredients were used as 80% by weight of the coating material, the remaining 20% being the liquid asphalt with the 70–85 penetration.

The coating material for Example 9 for mix 9 was a mixture of 20% by weight of liquid asphalt (70–85 penetration) and 80% by weight of an oil soluble epoxy resin containing an amine curing agent.

The coating material for Example 10 was a mixture of 20% by weight of liquid asphalt (70–85 penetration) and 80% by weight of a solution of an oil soluble polyester resin in styrene and a curing catalyst.

The coating solutions for mixes 9 and 10 also were of a 4% by weight solids content.

The mixes for Examples 8, 9 and 10 were tested, the results of which are as follows:

| MIX NO. | SAMPLE NO. | MOLDING TEMP. (°F) | VOLUME OF SAMPLE (CC) | CORRECTED FACTOR | STABILITY | CORRECTION STABILITY | FLOW |
|---|---|---|---|---|---|---|---|
| 8 | A | 450 | 470.8 | 1.04 | 2200 | 2288 | 11 |
| 8 | B | 450 | 422.2 | 0.93 | 4750 | 4418 | 19 |
| 8 | C | 450 | 497.4 | 1.00 | 4850 | 4850 | 17 |
| 9 | A | 450 | 468.8 | 1.09 | 3800 | 4142 | 12 |
| 9 | B | 455 | 396.5 | 1.47 | 2700 | 3969 | 14 |
| 9 | C | 460 | 406.8 | 1.39 | 2300 | 3197 | 12 |
| 10 | A | 450 | 403.3 | 1.39 | 2250 | 3128 | 11 |
| 10 | B | 440 | 435.2 | 1.19 | 3100 | 3689 | 13 |
| 10 | C | 440 | 401.5 | 1.39 | 3000 | 4170 | 10 |

Although the mix 8 had excellent stability, the flow property was close to being too brittle for most pavement applications, the flow being as high as 17 and 19.

As to the mix 9 (with the epoxy coated sand) the stability was good. The flow properties were better than that of Example 8 (the polyurethane-coated sand) but the flow properties were a little on the high side.

The mix with the epoxy coated sand, mix 10, was satisfactory from the standpoint of both the flow property and stability property. The epoxy resin is somewhat more difficult to handle as a coating resin and is generally much more expensive than the oil-soluble phenol-formaldehyde resin.

EXAMPLE 11

An asphalt composition for paving was prepared as described in Example 7 using the same ingredients except that the sand used was 90% by weight untreated sand and 10% by weight coated sand instead of 20% by weight of coated sand. The resultant paving compositions had good stability and flow properties as shown by the following results:

| MIX NO. | SAMPLE NO. | MOLDING TEMP. (°F) | VOLUME OF SAMPLE (CC) | CORRECTION FACTOR | STABILITY | CORRECTION STABILITY | FLOW |
|---|---|---|---|---|---|---|---|
| 11 | A | 450 | 416.3 | 1.32 | 2400 | 3168 | 11 |
| 11 | B | 460 | 437.8 | 1.19 | 3000 | 3570 | 9 |
| 11 | C | 455 | 454.5 | 1.19 | 3100 | 3689 | 10 |

Surprisingly, the stability property for Example 11 (10% by weight coated sand) was better than the stability property of Example 7 (20% by weight coated sand).

Thus in summary, the amount of coated particles of aggregate can be 1% to 95% by weight of pavement, although it is highly preferred that the amount of coated particles be about 2% to 50% or 60%, and the optimum amount be about 2% to 25% by weight of mineral aggregate used in the total pavement.

It is understood that various modifications can be made of the present invention without changing the spirit and scope thereof.

What is claimed is:

1. In a method of making an asphalt pavement in which hot asphalt is mixed with a mineral aggregate to provide a paving composition that is formed into pavement relatively soon after mixing, the improvement comprising the steps of:

1. mixing (1) about 4 to 10%, by weight, of the paving compositions of hot asphalt having a penetration of about 60 to 90 with (2) a finely divided mineral aggregate having a mesh size of about 4 to 200 mesh in which each particle has a size not substantially larger than about one-sixteenth inch, the aggregate including (A) particles of uncoated sand and (B) about 2 to 60%, by weight, of the composition of particles of sand coated with an oil-soluble curable thermoplastic resin that is compatible with the asphalt and (3) sufficient amount of a hardening agent for curing the resin when contacted with the hot asphalt, and 2. forming the mixture of step (1) and hardening the same into asphalt pavement having high stability and good flow properties, the pavement having a stability of at least about 1,200 pounds by the Marshall stability test and a flow of about 7 to 15 as measured by the inclined glass plate flow test in which millimeters of flow of a 0.5 gram tablet of the resin heated to 125°C are recorded when the plate is inclined 65° from the horizontal.

2. A method as defined in claim 1 in which the resin is an oil-soluble thermoplastic phenol-formaldehyde novolak resin.

3. A method as defined in claim 2 in which the mineral aggregate includes limestone dust in an amount of about 4 to 14%, by weight, of the paving composition, the total amount of coated and uncoated sand is about 70 to 90%, by weight, of the composition, and the novolak resin is a normally solid acid-catalyzed reaction product of about 0.75 to 0.9 moles of formaldehyde per mole of phenol.

4. In a method of making asphalt pavement in which asphalt is mixed with heated mineral aggregate to form a mineral aggregate/asphalt composition that is subsequently mixed with hot asphalt at the paving site to provide a paving composition that is formed into pavement relatively soon after mixing, the improvement which comprises the step of mixing a plurality of sand particles with a coating composition comprising (1) about 70 to 90 parts, by weight, of an oil-soluble phenol-formaldehyde novolak resin that adheres to the sand particle and is compatible with the asphalt (2) about 20 to 40 parts, by weight, of hot asphalt and (2) (3) a sufficient amount of a hardening agent comprising hexamethylene tetramine to convert the resin to a thermoset resin when mixed with the hot asphalt to provide thereby the mineral aggregate/asphalt composition that, when mixed with the asphalt, provides a pavement having high stability and good flow properties, the resultant pavement having a stability of at least 1500 pounds by the Marshall stability test.

5. A method as defined in claim 4 in which the asphalt pavement is formed from the following composition:

|  | % by Weight |
|---|---|
| Asphalt (penetration of 70–85 | 8.5 |
| Limestone dust | 12.0 |
| Natural sand (uncoated) | 63.6 |
| Sand (coated) | 15.9 |
| Total | 100.0 | composition includes about 2 to 40 parts of asphalt having a penetration of about 60 to 90 per 60 to 68 parts by weight of the novolak resin.

6. A method as defined in claim 4 in which the mineral aggregate is limestone dust and sand, the asphalt and uncoated mineral aggregate are hot enough to heat the resin and the hardening agent of the coating composition to a curing temperature of about 450°F for at least about 3 seconds, the coated sand being at least about 5% by weight of the total aggregate, and the coating composition comprises about 70 to 90 parts by weight of the novolak resin, about 10 to 30 parts of the asphalt, about 5 to 15 parts hexamethylene tetramine, and about 2 to 10 parts of wax as a lubricant.

7. An asphalt composition for forming into pavement having good durability, skid resistance, smoothness, high stability and good flow, the composition comprising:
   a. about 8.5 parts, by weight, of asphalt having a penetration of about 60 to 90,
   b. about 12 parts, by weight, of a mineral aggregate comprising limestone dust, and
   c. about 79.5 parts, by weight, of a plurality of finely divided particles of sand, about 10%, by weight, of the particles being coated with a coating composition comprising an oil soluble thermosettable phenol-formaldehyde resin compatible with the asphalt, and sufficient hardening agent to cure the resin to provide the pavement having a stability of at least about 1500 pounds measured by the Marshall stability test and a flow of about 7 to 15 as measured by the inclined glass plate flow test in which the millimeters of flow of a 0.5 grams tablet of the resin heated to 125°C are recorded when the plate is inclined at 65° from the horizontal.

8. A composition as defined in claim 1 in which the mineral aggregate includes limestone dust and sand, and the oil soluble resin is a phenol-formaldehyde novolak resin that is the acid-catalyzed reaction product of about 0.75 to 0.9 moles of formaldehyde per mole of phenol.

9. A composition as defined in claim 7 in which the asphalt has a penetration with a range of 70 to 85 and the resin is a phenol-formaldehyde novolak resin that is the acid-catalyzed reaction product of about 0.75 to 0.9 moles of formaldehyde per mole of phenol.

10. A sand/asphalt pavement having high stability and flow containing a bituminous binder and a mineral aggregate having a mesh size of about 4 to 200 mesh in which each particle has a size not substantially larger than about one-sixteenth inch, the aggregate including uncoated sand particles and about 2 to 60%, by weight, of the pavement being particles of coated sand, each sand particle being coated with a coating composition comprising an oil soluble thermoplastic resin compatible with the bituminous binder and sufficient hardening agent to convert the resin to a thermoset resin when mixed with the hot bituminous binder, the pavement having a stability of at least about 1,200 pounds as measured by the Marshall stability test and a flow of about 7 to 15.

11. A pavement as defined in claim 10 in which the oil soluble resin is a phenol-formaldehyde novolak resin and the hardening agent is hexamethylene tetramine.

12. A pavement as defined in claim 11 in which the bituminous binder is an asphalt having a penetration of about 60 to 90 and comprises about 8.5% by weight of the pavement, the mineral aggregate is a mixture of limestone dust in an amount of about 12% by weight of the pavement, the total sand is about 79% by weight of the pavement, and the coated sand is about 10% by weight of the total sand.

13. A pavement as defined in claim 12 in which the novolak resin is an acid-catalyzed reaction product of about 0.75 to 0.9 moles of formaldehyde per mole of phenol.

14. A pavement as defined in claim 13 in which the hexamethylene tetramine is about 15% by weight of the novolak resin and the coating composition contains wax as a lubricant.

15. An asphalt composition for forming into pavement having good durability, skid resistance, smoothness, high stability and good flow, the composition comprising:
   a. about 4 to 10%, by weight, or the composition of asphalt having a penetration within a range of 40 to 130, and a mineral aggregate having a mesh size of about 4 to 200 in which each particle has a size not substantially larger than about one-sixteenth inch, the aggregate including (A) particles of uncoated sand and (B) about 2 to 60%, by weight, of the composition of particles of sand coated with a coating composition comprising an oil soluble thermosetting resin, compatible with the asphalt, and (C) sufficient hardening agent to cure the resin to provide the pavement having a stability of at least about 1,200 pounds measured by the Marshall stability test and a flow of about 7 to 15 as measured by the inclined glass plate flow test in which the millimeters of flow of a 0.5 grams tablet of the resin heated to 125° are recorded when the plate is inclined at 65° from the horizontal.

16. A composition as defined in claim 15 and in which the mineral aggregate includes limestone dust used as a filler material.

17. A composition as claimed in claim 15, whereby the asphalt and uncoated mineral aggregate are hot enough and mixed sufficiently together to heat the resin and hardening agent of the coated aggregate to a curing temperature of at least about 400°F that is sufficient to provide the pavement with a stability of at least 1200 pounds measured by the Marshall stability test and a flow of about 7 to 15 as measured by the inclined glass plate flow test in which the millimeters of flow of a 0.5 grams tablet of the resin heated to 125°C are recorded when the plate is inclined at 65° from the horizontal.

* * * * *